Figure 1:
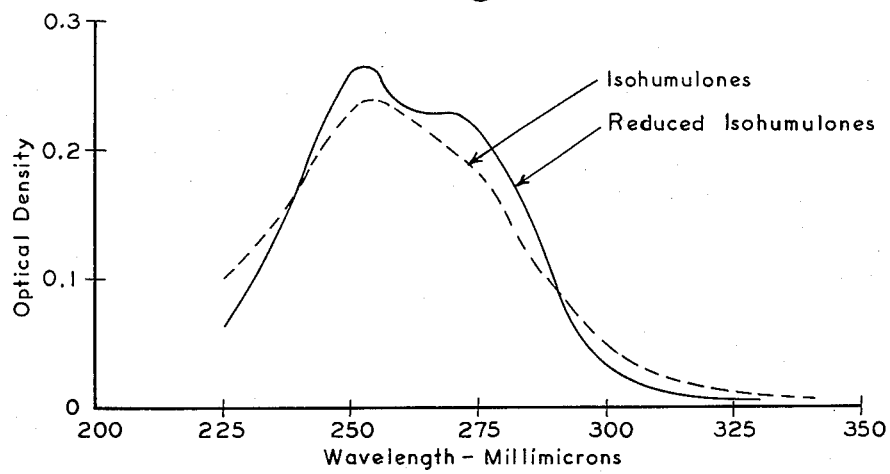

INVENTORS
GILBERT H. KOCH
WILLIAM C. HERWIG
THOMAS L. KISSEL
BY
*Louis Quarles*
ATTORNEY 3,044,879
ANACTINIC MALT PRODUCT AND HOP EXTRACT THEREFOR
Gilbert H. Koch and William C. Herwig, Milwaukee, and Thomas L. Kissel, Hartford, Wis., assignors to Miller Brewing Company, Milwaukee, Wis., a corporation of Wisconsin
Filed Feb. 11, 1959, Ser. No. 792,521
20 Claims. (Cl. 99—50.5)

This invention relates to manufacture of anactinic malt beverages such as beer and ale, and to intermediate products.

It is well known that beer and ale and similar malt beverages are produced from water, barley malt, adjuncts and hops. The malt and adjuncts furnish the carbohydrates and other growth essentials which make up the wort. This wort, boiled with hops, in turn forms the basic substance for fermentation in the fermenting tanks. The hops give the characteristic bitter flavor and pleasant aroma to the beer. They assist in preserving the beer and improve its foam holding capacity.

Unfortunately, beer and ale and other similar malt beverages are not stable to light. Light of both visible and invisible wave lengths affects them adversely producing actinic damage in the form of a characteristic skunky odor. Such a beer is commonly known as "light struck." The actinism is caused by chemical changes, producing compounds probably mercaptanous in nature. Tests show that the olfactory threshold level of odoriferous compounds of this character is very low, in the range of a few parts per billion. This shows clearly the acute nature of the problem.

Many efforts have been made in the past to overcome this difficulty. Much time has been expended on packaging of beer and ale to exclude light. Colored bottles have been used and opaque packages are common. It is not uncommon to label them "Do Not Expose to Light."

To compete with modern day merchandising, a malt beverage has to be removed from the case and put on the shelf, or at least a portion of the container is exposed for easy vision and access. Modern reach-in coolers have clear glass windows and fluorescent lights which aggravate the problems. Even canned beer or keg beer can be adversely affected by sunlight if, as is usually the case, it is drunk from a glass. The exposure of beer in the glass to direct sunlight for a short a time as a few minutes will result in the impairment of the taste and production of the characteristic skunky odor. Beer at picnics and sporting events is often exposed for hours to direct sunlight. In such cases, the deleterious effects can be very marked.

We have discovered a way to overcome the hazard of product exposure to light which forms the basis of our invention, and have thereby achieved a substantially anactinic malt beverage. The term "anactinic" is intended to succinctly describe a beverage which will not be subject to actinic damage. The word is herein coined and is derived from the word "actinic" plus the prefix "an," meaning "not." This is the Greek equivalent to the Latin "in" and consists of "alpha privative" plus "nu movable."

We have found that three factors are necessary for the reaction causing malt beverages to become light struck. They are photo energy in the wave length region of 1,000 to 10,000 angstroms, a sulfhydryl bearing compound, and a chemical component derived from the raw materials, hops, during the brewing process.

The primary object of the invention is to provide a hop extract and malt beverage that is stable to light and will not produce unpleasant olfactory characteristics.

A further object of the invention is to so treat the hops in malt beverages so as to retain the aroma, bouquet and bitterness in the finished product, but eliminate the photoactive elements thereof.

A still further object of the present invention is to provide a method of treating hop extract in the presence of a reducing agent to provide a concentrated product having particular application in malt beverages production, whereby its use will not affect the desired characteristics of the beverage, but will eliminate photoactive elements therein.

The soft resins and oils, which are contained in the glands produced on the hops and known as lupulin glands, are valuable constituents of the hops as used in the brewing process. The soft resins consist principally of (a) the alpha acids, (b) the beta acids, and (c) the uncharacterized soft resins. The alpha acids are known as humulones and the beta acids are known as lupulones. The alpha acids are the source of antiseptic and bitter substances in beer. The beta acids or lupulones have low solubility in kettle wort and beer, thus do not appreciably enter into the brewing process.

It is known that chemical changes are made in the humulones during brewing resulting in the compounds known as isohumulones, i.e. isohumulone, isocohumulone, isoadhumulone, and isoprehumulone. These iso-compounds are formed in the kettle during the boiling stage of the brewing process, and we have discovered that these compounds are the ones that cause the beer to become sensitive to light in the presence of sulfhydryl compounds.

During the brewing process, the hops are added to the wort and boiled with it. As a result, the extracted humulone fraction, consisting of humulone, adhumulone, cohumulone, and prehumulone, is isomerized to the corresponding isohumulones. It is known that during the isomerization of the humulones to isohumulones, a new side chain is formed which now contains a carbonyl group. It is these isohumulones—isohumulone, isocohumulone, isoadhumulone, and isoprehumulone—which we have found to be involved in the photochemical reaction with sulfhydryl compounds to produce the actinic damage resulting in the characteristic light struck aroma.

We are of the belief that when the isohumulones are exposed to light, a photochemical reaction takes place involving the cleavage of this side chain from the ring structure forming free radicals. These free radicals derived from the side chain in turn react with sulfhydryl groups to form an odoriferous compound or compounds.

We also believe that the functional portion of the isomers entering into the light reaction is the carbonyl group of the isohexenoyl side chain. This reactive carbonyl group can be altered by means of reduction to a secondary alcohol, and by such alternation, be prevented from reacting with the sulfhydryl groups normally present in beer components.

In practicing our invention, one method is to prepare pure humulones. The pure humulones are isomerized to their respective iso derivatives and subsequently reduced through the addition of sodium borohydride or potassium borohydride (Example 1). Subsequent research has shown that by proper adjustment of temperature and normalities, the purified humulones can be isomerized and reduced in one combined step (Example 2).

For a more practical approach, investigation of the whole hops indicated that they could be extracted, isomerized and reduced similar to the pure humulones (Example 3). Investigation has shown that the lupulone fraction when exposed to light in the presence of —SH groups can produce a mercaptanous odor. It is our belief that traces of lupulone under specific conditions could be soluble in kettle wort and beer. A method for the removal of this lupulone fraction through a preliminary extraction of an isomerized and reduced hop extract was accomplished (Example 4).

Once again it was desired to investigate the practice of combined isomerization and reduction of a hop extract, resulting in the procedure of Example 5.

Utilizing the technique of a combined isomerization and reduction method and then removing the lupulone fraction has also resulted in a practical and desired procedure (Example 6).

The techniques used in the above examples have also been found to be applicable to fresh hops (Example 7).

The following seven examples illustrate satisfactory procedures for carrying out the invention, but it will be understood that they are presented purely for purposes of illustration and not as indicating the limits of the invention, e.g. temperature, solvent, type of reducing agent, pH, concentration of the components, etc.

Figure 2:
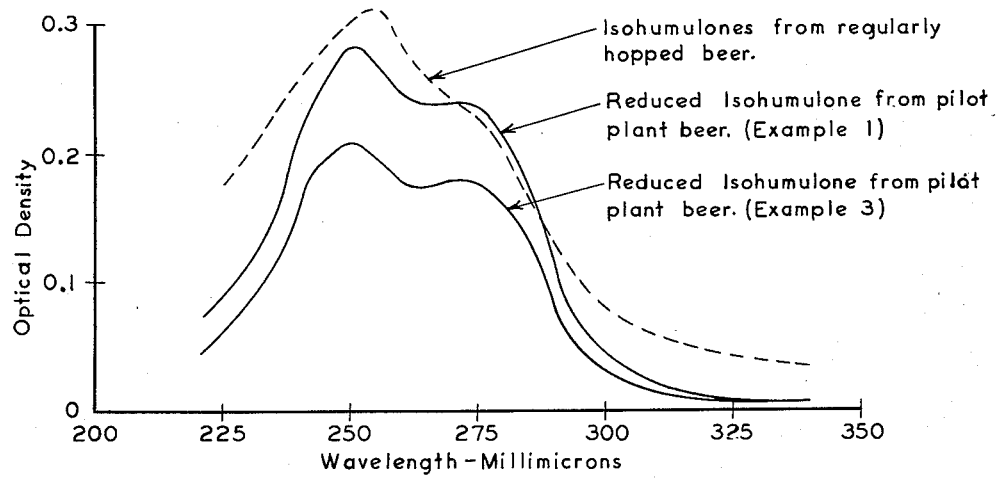

The various examples will be more clearly understood when considered with the appended drawing in which:

FIG. 1 is a graphical presentation illustrating a comparison of ultraviolet absorption curves in alkaline methanol of isohumulones in an unreduced state with a typical curve of reduced isohumulones prepared in accordance with certain steps of Example 1; and FIG. 2 is a graphical presentation similar to FIG. 1 of typical ultraviolet absorption curves of iso-octane extracts of various comparative beers in alkaline methanol, and in accordance with practices outlined in Examples 1 and 3.

*Example 1.—Isomerization of Purified Humulone and Reduction of the Isohumulone*

200 grams of ground, dried hops are packed in a tube and extracted with 3 liters of low boiling petroleum ether (Skellysolve F). The petroleum ether is evaporated in vacuo and the oily residue is taken up in a minimum amount of absolute methanol. The hop waxes which precipitate upon chilling the methanol extract in an ice bath are filtered off and washed with cold methanol. The diluted filtrate is heated to 60° C. and the humulones are precipitated as a lead complex by the addition of 10% methanolic lead acetate solution until precipitation is complete. The lead humulate is digested at 60° C. for 30 minutes, cooled to room temperature and centrifuged. The residue is washed three times by slurrying with small amounts of methanol.

The humulones are freed from their lead complex by slurrying the lead humulate in 90% methanol and adding 1 M $H_2SO_4$ in methanol with agitation until all of the lead humulate has been dissociated and precipitation of lead sulfate is complete. The insoluble lead sulfate is removed by centrifugation. An equal volume of 2% $H_2SO_4$ is now added to the lead-free solution of humulones whereupon the humulones become insoluble and are recovered by extracting three times with petroleum ether. The petroleum ether is evaporated in vacuo and the humulones may be taken up in a suitable solvent and used in the reduction process such as that described below, or they may be first further purified by repeating the precipitation of lead humulate and the subsequent recovery of humulones therefrom.

A solution of 2.43 grams of re-purified humulones in 28 ml. of ethanol in a 500 ml. flask is treated with 7.3 ml. 1 N sodium hydroxide to neutralize the acidity of the humulones. Sufficient 0.2 M phosphate buffer and water are added to make a final volume of 243 ml. containing 1% humulones at pH 11. The contents of the flask are heated to boiling under reflux for 45 minutes during which time the humulones are converted to isohumulones as evidenced by the typical spectrophotometric curve of isohumulones in the ultraviolet region as illustrated in FIG. 1 of the drawing. The reaction flask and its contents are cooled to room temperature.

The chemical reduction of the isohumulones is accomplished by adding 700 mg. $KBH_4$ to 230 ml. of the isohumulone solution and stirring at room temperature for 4 hours. At this point the excess borohydride is decomposed by acidification with 6 N hydrochloric acid to pH 2 and the reduced isohumulones are recovered by extraction with petroleum ether. The boric acid remains in the aqueous solution. The petroleum ether is removed in vacuo leaving a bitter product which is light stable when tested in the presence of sulfhydryl-containing compounds. The spectrophotometric curve of FIG. 1 illustrates the ultraviolet absorption in alkaline methanol to provide the typical plateau of reduced isohumulones exhibited between approximately 260 to approximately 275 millimicrons wave length range. In contrast, isohumulones which have not been reduced exhibit a spectrophotometric curve of gradual descent in the same range.

The reduced isohumulones are taken up in 100 ml. of ethanol and 76.5 ml. of the ethanolic solution containing 1.25 grams of reduced isohumulones is added to 23 liters of unhopped wort. The wort thus treated is boiled, cooled, pitched with yeast and fermented. The resulting beer is processed by the usual procedures known to the art. The beer has good foam and taste characteristics.

When the beer in a clear glass bottle is exposed for two hours in a light box containing two daylight-type fluorescent lights and two ultraviolet black lights at a distance of several inches, the beer did not have a skunky aroma. A regularly hopped production beer exposed to light under the same conditions did become light-struck (skunky).

A comparative spectrophotometric analysis of finished beers is illustrated in the curves of FIG. 2, which exhibit a typical non-reduced isohumulone curve of gradual descent in the approximate 260–275 millimicron wave length range. This contrasts with the typical plateau exhibited by a beer produced by using the reduced isohumulones of Example 1. In order to obtain these curves from regular hopped, commercially available beers, an initial extraction was made with iso-octane, an aliquote of which was diluted with alkaline methanol.

*Example 2.—Combined Isomerization of Purified Humulone and Reduction of Isohumulone*

A solution of 0.88 gram of re-purified humulones in 17 ml. of ethanol is neutralized with 2.7 ml. of 1 N sodium hydroxide and mixed with 80 ml. of 0.125 N sodium hydroxide containing 300 mg. of potassium borohydride. The alkaline solution is held at 60° C. for 1 hour during which time the humulones isomerize to their respective isohumulones which concomitantly are acted upon by the borohydride to form the reduced isohumulones. The contents of the reaction flask are now cooled to room temperature whereupon the excess borohydride is decomposed by addition of 6 N hydrochloric acid, decreasing the pH of the alkaline solution from 12.6 to 2. The reduced isohumulones which separate are recovered by extraction with petroleum ether (Skellysolve F). The solvent is evaporated in vacuo and the bitter residue is taken up in ethanol. The ethanolic extract of the reduced isohumulones can now be used in production of a light stable beer.

*Example 3.—Isomerization and Subsequent Reduction of a Hop Extract*

50 grams of ground, dried hops are extracted in a tube by passing 1.2 liters of petroleum ether (Skellysolve F). The extract is concentrated under vacuum and the volume adjusted to 250 ml. According to spectrophotometer analysis, 3.05 grams of humulones and 2.15 grams of lupulones are present from the hop extraction. The petroleum ether is evaporated in vacuo and the dark, oily residue is taken up with 30 ml. ethanol. The bitter acids contained therein are neutralized with 14.5 ml. 1 N NaOH. The solution is buffered at pH 11 with 150 ml. 0.2 M phosphate buffer and diluted to 300 ml. with water. This 1% humulone solution is refluxed 90 minutes to convert the humulones to isohumulones and then cooled. The chemical reduction of the isohumulones is now accomplished by the addition of 874 mg. potassium borohydride and stirring at room temperature for 4 hours. One-half of the solution (150 ml.) is acidified to pH 2 with 6 N HCl to decompose the excess borohydride. This acidification causes the reduced isohumulones, the partially altered lupulones and other substances to become insoluble. This mixture is extracted with petroleum ether to recover the reduced isohumulones and other substances soluble in petroleum ether. The boric acid, however, remains in the aqueous solution. After removal of the petroleum ether in vacuo, the oily residue is taken up in 100 ml. of ethanol.

The ethanolic solution containing approximately 960 mg. of reduced isohumulone according to spectrophotometric assay is added to 21 liters of unhopped wort from the brewhouse. The wort is boiled, cooled, pitched with yeast and fermented. The resulting beer is processed by the usual procedures known to the art. The beer possesses all of the usual fine qualities and is not sensitive to light. The somewhat light-sensitive lupulone fraction of the hop extract which is more resistant to the above chemical reduction has been eliminated through its insolubility in wort and beer.

A beer made in accordance with the present method provided a spectrophotometric ultraviolet absorption curve as illustrated in FIG. 2 and including the characteristic plateau in the approximate 260–275 millimicron wave length range.

*Example 4.—Removal of Lupulone Fraction After Isomerization and Subsequent Reduction*

The second half of the isomerized and reduced hop extract solution from the chemical reduction process in Example 3 is acidified with 6 N HCl to pH 6.5, although we have found adjustment to a pH between 6.0 and 8.5 to be equally effective. This treatment decomposes the excess borohydride and causes the lupulone fraction to become insoluble. The mixture is extracted with petroleum ether (Skellysolve F) which completely removes the partially altered lupulone fraction and leaves most or all of the reduced isohumulones in the aqueous phase. This aqueous phase is now further acidified with 6 N HCl to pH 2 and the mixture is extracted with petroleum ether to recover the reduced isohumulones which contribute to the desirable bitter character and foam stability of beer. Again, the boric acid remains in the aqueous phase. After evaporation of the petroleum ether, the reduced isohumulone fraction is taken up in 100 ml. ethanol and assayed spectrophotometrically.

77 ml. of the ethanolic solution containing about 1.05 grams of reduced isohumulone is added to 21 liters of boiling, unhopped wort. The cooled wort is fermented with yeast and the resulting beer, processed in the usual manner, was not sensitive to light, in accordance with the light test set forth in Example 1.

*Example 5.—Combined Isomerization and Reduction of a Hop Extract*

150 grams of ground, dried hops are extracted in a tube by passing 2 liters of petroleum ether (Skellysolve F). The extract is concentrated under vacuum and the volume adjusted to 250 ml. According to spectrophotometric analysis, 8.63 grams of humulones and 6.25 grams of lupulones are present from the hop extraction. A portion of the petroleum ether extract (115 ml.) is evaporated in vacuo and taken up in 40 ml. of ethanol. The bitter acids contained therein are neutralized with 19.0 ml. of 1 N NaOH and the solution diluted to 100 ml. with water. This solution of hop extract is added to 300 ml. of an alkaline solution of borohydride at 70° C. containing 40 ml. of 1 N NaOH and 1.258 grams of potassium borohydride. The resulting mixture which now contains 1% humulone and 0.1 N alkalinity is held at 60° C. for 3 hours. During this time the humulones are isomerized to the respective isohumulones which concomitantly are acted upon by the borohydride to form the reduced isohumulones as evidenced by the changes in the spectral curves in the ultraviolet region. The solution is cooled to room temperature.

A 150 ml. portion of the alkaline solution is acidified to pH 2 to decompose the excess borohydride and the reduced isohumulones are recovered by extracting with petroleum ether together with other substances soluble in this solvent. The boric acid remains in the aqueous phase during the extraction. The petroleum ether is evaporated in vacuo and the oily, bitter residue is taken up in 100 ml. of ethanol. The ethanolic solution containing 1 gram of reduced isohumulones according to spectrophotometric assay is now added to 22 liters of boiling wort from the brewhouse. The wort is boiled, cooled and fermented with yeast. The resulting beer is processed in the usual manner known to the art and was found to be stable to light.

*Example 6—Removal of Lupulone Fraction After Combined Isomerization and Reduction*

Another 150 ml. portion of the hop extract solution from the combined chemical isomerization and reduction process in Example 5 is acidified with 5 N HCl to pH 6.4. The excess borohydride is then decomposed and the lupulone fraction becomes insoluble. The mixture is extracted with petroleum ether (Skellysolve F) which completely removes the partially altered lupulone fraction and leaves most or all of the reduced isohumulones in the aqueous phase. This aqueous phase is now further acidified with 5 N HCl to pH 2 and the mixture is extracted with petroleum ether which recovers the desirable reduced isohumulone. After evaporation of the solvent, the residue is taken up in 100 ml. ethanol and the ethanolic solution containing about 0.93 gram of reduced isohumulones is added to 21 liters of boiling, unhopped wort. The cooled wort is fermented with yeast, processed in the usual manner, and the resulting beer is not sensitive to light.

*Example 7—Isomerization and Subsequent Reduction of Extract From Fresh Hops*

335 grams of fresh, undried hops are packed in a tube and extracted with 4 liters of petroleum ether (Skellysolve F). The solvent is evaporated in vacuo and the oily residue taken up in ethanol and filtered to remove insoluble material. The alcoholic filtrate is brought to 250 ml. with ethanol. According to spectrophotometric assay, 4.75 grams of humulones and 3.45 grams of lupulones have been recovered from the fresh hops. An amount of the hop extracted containing 2 grams of humulones in 20 ml. of ethanol is treated with 8.0 ml. of 1 N NaOH to neutralize the humulones and lupulones, and further diluted with 100 ml. 0.2 M phosphate buffer and water to make a final volume of 200 ml. The alkaline solution at pH 11 is refluxed for 90 minutes to isomerize the humulones to their respective isohumulones. The solution is cooled, whereupon 596 mg. of potassium borohydride are added and the reaction mixture stirred for 4 hours at room temperature. The excess borohydride is decomposed by the addition of 6 N HCl to a pH 2. The insoluble material containing the desired reduced isohumulones is extracted with petroleum ether. The solvent is evaporated in vacuo and the oily residue taken up in 50 ml. of ethanol. A portion of the ethanolic extract containing about 1.0 gram of reduced isohumulones is added to 21 liters of boiling, unhopped wort. The wort is cooled, fermented with yeast and the beer is processed in the usual manner. The beer is stable to light in accordance with the light test set forth in Example 1.

In the practice of our invention, we are not limited to the conditions set forth in the above examples. The chemical reduction of the isohumulones with sodium borohydride or potassium borohydride can be accomplished in non-aqueous solvents such as alcohols, amines and glycol ethers. Lithium aluminum hydride would require anhydrous ethyl ether and other solvents of the ether class. These are but a few of the possible variables in reducing agents and solvents.

The isomerization and reduction of the isohumulones can be carried out over fairly wide pH and temperature ranges, although mildly alkaline conditions and moderate temperatures are preferred. The concentration of the reducing agent can be varied within reasonable limits. Other acids besides hydrochloric acid could be used to reduce the pH and decompose the excess borohydride. Hydrocarbons, chlorinated hydrocarbons, ethers and other solvents which are immiscible with water and will appropriately dissolve the product can be used in place of petroleum ether to recover this product.

The concentration of humulone being isomerized to isohumulone which in turn is reduced can be varied considerably. While in the above examples, we have used solutions containing 1% humulone, we have also worked with 0.1%, 5% and 10% humulone solutions.

Although it is preferred to add the hop extract directly to the wort as described in Example 1, we have further found that the hop extract obtained in accordance with the present invention may be added at any stage of the usual brewing process to provide an acceptable beer or ale product. It will be apparent that lesser amounts are required if added during steps following the boiling or cooking of the wort.

As previously stated, we have found that the spectral absorption properties of isohumulones, when measured in alkaline methanol, have been changed as a result of the reduction technique. This change occurs in the ultraviolet region corresponding to about 260 to 275 millimicrons. FIG. 1 illustrates the typical ultraviolet absorption spectra of the isohumulones and the reduced isohumulones described in Example 1 above. The spectral curve of FIG. 1 of the isohumulones resulting from the isomerization of purified humulones exhibits only a slight inflection in the 260 to 275 millimicrons region. However, the spectral curve of FIG. 1 of the reduced isohumulones obtained from the chemical reduction of these same isohumulones has a pronounced flat or plateau portion, which portion may, in some cases, include a second maximum in this same 260 to 275 millimicron part of the spectrum.

FIG. 2 is illustrative of the typical ultraviolet absorption spectra of isohumulones and reduced isohumulones when measured in alkaline methanol after extraction of beer with iso-octane. The spectral curve of the regularly hopped beer of FIG. 2 results from the iso-octane extraction of a production beer made in the usual manner, wherein whole dried hops are boiled with wort. It is similar to the non-reduced isohumulone curve of FIG. 1 in that it has the typical curvature due to isohumulones which have not been chemically reduced. The remaining comparative curves of FIG. 2 are the spectral absorption curves of the reduced isohumulones recovered by isooctane extractions of pilot beers from Examples 1 and 3 above. These two curves have the same general form in the 260 to 275 millimicron region of the ultraviolet spectrum as that for the reduced isohumulones shown by curve 2 of FIG. 1.

It is quite obvious, therefore, that an iso-octane extract of any beer containing chemically reduced isohumulone as set forth in our invention, and as we have found, will show a significant difference in spectral absorption properties in the 260 to 275 millimicron region of the electromagnetic spectrum when said iso-octane extract is diluted with alkaline methanol and evaluated spectrophotometrically, as compared to a beer containing isohumulone not so treated.

Although the various foregoing examples of practicing our invention have been set forth in particularity, it will be appreciated that our invention is to be considered in its broadest scope—that of providing an improved fermented malt beverage having the taste and characteristics of beer or ale, which beverage is light stable in both visible and invisible wave lengths tending to affect it adversely, thereby producing an actinic damage in the form of a characteristic skunky odor, and in which the various known components entering into photochemical reactions may either be entirely removed or rendered inactive in the presence of offending light rays.

In essence, we believe that we are the first to have discovered that certain components of hops are the offenders, either in themselves, or in reaction with other components, which have caused the deleterious actinic damage which has long plagued brewers of fermented malt beverages. We have further investigated certain of these components, either from the dried or fresh hops as a starting material, and have found that these components may be further subjected to techniques for rendering them inactive in the presence of sulfhydryls to thereby initially prevent the formation of offending substances in the presence of light. It is fully realized that other techniques may in the future be developed for treating the said hop components to render them inactive. It is to be understood that the foregoing examples have been set forth, not by way of limitation in any manner, but as a means of fully disclosing procedures which will enable those skilled in the art to successfully practice our invention.

We claim:

1. A bittering agent for a fermented malt beverage, said bittering agent being derived from hops and including metal borohydride treated isomerized humulone hop constituents.

2. A light stable, fermented malt beverage selected from the group consisting of beer and ale, and including a bittering agent derived from hops and comprising metal borohydride treated hop constituents.

3. The method of preparing a light stable hops extract including, as a process step, chemically reducing light-reactive components thereof in the presence of a metal borohydride.

4. A light stable, fermented malt beverage selected from the group consisting of beer and ale, and including a bittering agent comprising metal borohydride treated isohumulones.

5. A light stable, hop containing, fermented beverage selected from the group consisting of beer and ale including a bittering extract derived from hops from which the lupulones have been removed and which contains metal borohydride treated isohumulones.

6. A light stable, fermented, comestible beverage, an isooctane extract of which, in alkaline methanol, exhibits a spectral ultraviolet absorption curve of optical density plotted versus wave length in millimicrons, and exhibiting a positive slope curve portion approaching a maximum optical density value at approximately 250 millimicrons and a generally negative slope therefollowing and including an accentuated intermediate plateau-like curve portion in the approximate wave length range of 260 to 275 millimicrons.

7. A hop extract for use in brewing including metal borohydride treated isohumulones.

8. A hop extract for use in brewing derived from hops from which the lupulones have been removed and the humulones have been converted to isohumulones and treated with a metal borohydride.

9. A hop extract exhibiting a spectral ultraviolet absorption curve of optical density plotted versus wave length in millimicrons in an alkaline methanol extract thereof said curve exhibiting a positive slope curve portion approaching a maximum optical density value at approximately 250 millimicrons and a generally negative slope therefollowing and including an accentuated intermediate plateau-like curve portion in the approximate wave length range of 260 to 275 millimicrons.

10. The method of extracting humulone from hops and treating the humulone to render the same photochemically non-reactive when present in a malt fermented beverage selected from the group consisting of beer and ale, said method comprising the steps of subjecting the hops to the action of a solvent in which the humulones are substantially soluble, separating the humulone portion therefrom, isomerizing the humulone portion, chemically reducing the isohumulone portion with a metal borohydride, and separating the reduced isohumulone portion from the reaction mixture.

11. The method of claim 10 wherein the humulone is separated from the solvent extract by first precipitating the same by forming a lead-humulone complex and next freeing the humulone from said complex by forming lead sulfate upon the addition of sulfuric acid thereto.

12. In the method of preparing a malt beverage including the steps of preparing a wort, fermenting the said wort and subsequently recovering the resulting beverage, the step of adding to said beverage a selected amount of a metal borohydride reduced isohumulone-containing material.

13. The method of claim 12 wherein the borohydride reduced isohumulone-containing material is added at the wort preparation stage.

14. The method of treating humulone to render the same photochemically non-reactive when present in a malt fermented beverage selected from the group consisting of beer and ale and comprising the steps of chemically converting the humulone to isohumulone, chemically reducing the isohumulone with a metal borohydride, and separating the reduced isohumulone from the reaction mixture.

15. The method of treating humulone to render the same photochemically non-reactive when present in a malt fermented beverage selected from the group consisting of beer and ale and comprising the steps of isomerizing the humulone in the presence of an alkali, chemically reducing the isohumulone in the presence of a metal borohydride selected from the group consisting of sodium borohydride, lithium borohydride and potassium borohydride, and separating the reduced isohumulone from the reaction mixture.

16. The method of claim 15 wherein the isomerization and borohydride reduction steps are conducted concurrently in the presence of an alkali.

17. The method of preparing an extract of hops wherein the constitutents of said extract are rendered photochemically non-reactive when added as a bittering agent to malt fermented beverages selected from the group consisting of beer and ale, said method comprising the steps of subjecting the hops to the action of a solvent in which certain hop constituents including humulones and lupulones are substantially soluble, separating said hop constituents from the solvent, subjecting said constituents to the action of an alkali to isomerize the humulones, adding a metal borohydride to the constituents to chemically reduce the isohumulones contained therein, acidifying the mixture to decompose the borohydride, recovering the extract constituents by subjecting the mixture to the action of a solvent in which the constituents are soluble, and separating the constituents from the solvent.

18. The method of claim 17 wherein the mixture containing the reduced isohumulones and borohydride is acidified to a pH of between about 6.0 and 8.5 to cause the lupulone fraction to become insoluble, and extracting the hop constituents containing the reduced isohumulones by subjecting the mixture to the action of a solvent in which the constituents, with the exception of the altered lupulone fraction, are soluble.

19. The method of claim 17 wherein the isomerization and borohydride reduction steps are conducted concurrently.

20. The method of claim 18 wherein the isomerization and borohydride reduction steps are conducted concurrently.

References Cited in the file of this patent

UNITED STATES PATENTS 2,824,803     Stark _____ Feb. 25, 1958

OTHER REFERENCES

Wallerstein Laboratories Communications (Abstracts), March 1958, vol. XXI, No. 72, "Recent Advances in the Chemistry of Hop Constituents" and "Resolution of Mixtures of Cohumulone, Humulone and Adhumulone by Reversed Phase Partition Chromatography," pp. 65 and 66.

Wallerstein Laboratories Communications, September 1958, vol. XXI, No. 74, article "Hop Evaluation and Utilization," pp. 183 to 200.

Wallerstein Laboratories Communications, December 1958, vol. XXI, No. 75, article, "Posthumulone, a New 'Alpha Acid'" and article, "4-Desoxy-humulon, a New Hop Bitter Substance," pp. 339, 340 and 341, article "Chemistry of Hop Constituents. XI. Some Observations on the Isomerization of Humulone."

Howard, G. A., et al.: J. Inst. Brewing, 1957, vol. 63, pp. 237–248. Also abstracted in Wallerstein Communications, vol. XXI, No. 75, pp. 340–341.

Walker, T. K., et al.: Petit J. Brasseur, 1956, vol. 64, No. 2609, pp. 552–558. Also abstracted in Wallerstein Communications, vol. XXI, No. 72, pp. 65–66.

Rigby, F. L., et al.: J. Instit. Brewing, 1955, vol. 61, No. 4, pp. 325–332. Also abstracted in Wallerstein Communications, vol. XIX, No. 66, page 259.